Dec. 23, 1947.    R. B. KINZBACH    2,433,127
MACHINE TOOL HOLDER
Filed Oct. 18, 1943
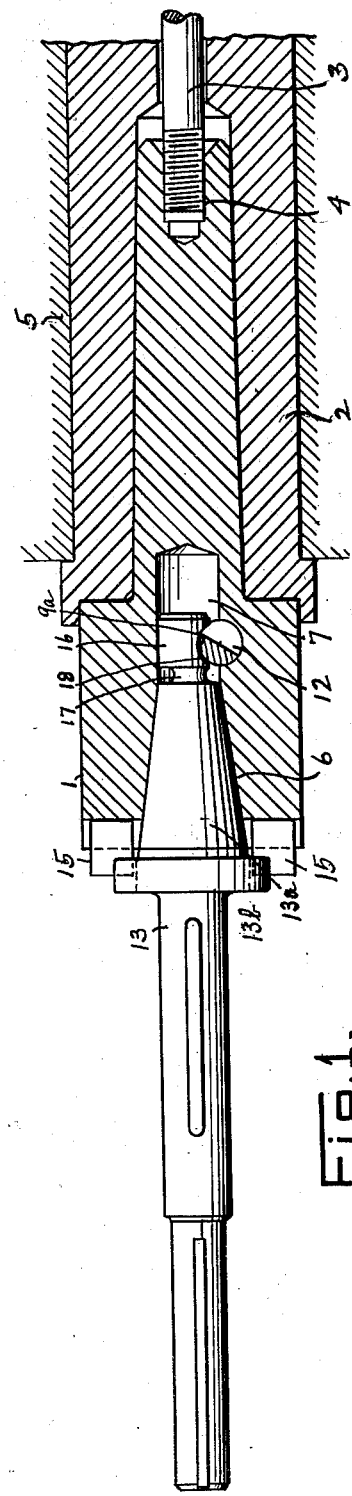
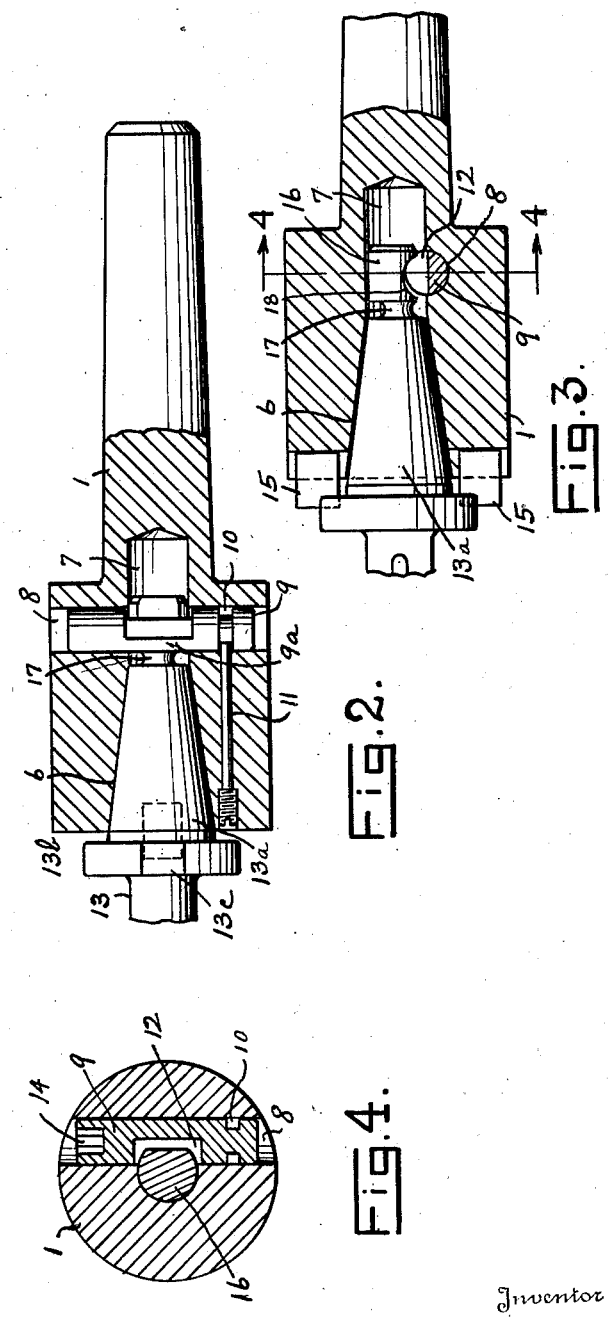
Inventor
Robert B. Kinzbach
By
E. V. Hardway, Attorney Patented Dec. 23, 1947

2,433,127

UNITED STATES PATENT OFFICE 2,433,127

MACHINE TOOL HOLDER

Robert B. Kinzbach, Houston, Tex.

Application October 18, 1943, Serial No. 506,779

2 Claims. (Cl. 279—77)

This invention relates to a machine tool holder and has particular relation to means for securing the tool shank in the holder.

An object of the invention is to provide a holder and shank of such construction that the shank will be in exact axial alinement with the holder when the shank is fully seated and locked in the holder.

Another object of the invention is to provide an improved type of tool shank with interlocking means carried by the holder whereby the shank may be readily locked in the holder in exact axial alinement with the holder and which may be readily released for removal when desired.

Means have heretofore been provided for locking a tapered shank in a tapered socket but the locking arrangement is such that when the shank is locked in seated position it will not be in exact axial alinement with the holder thus causing a slight wabbling movement to the tool on the shank. With the present invention the shank will be locked in exact axial alinement with the holder and the tool will consequently run true.

With the above and other objects in view the invention has particular relation to certain novel features of construction and arrangement of parts and example of which is given in this specification and illustrated accompanying drawing wherein:

Figure 1 shows a longitudinal sectional view of assembly showing the tool holder mounted in the standard spindle and showing the improved tool shank locked in the holder.

Figure 2 shows a sectional view of the holder taken at right angles to the view shown in Figure 1 and showing the tool shank locked therein.

Figure 3 shows a similar fragmentary view of the assembly showing the holder and shank in unlocked position and Figure 4 shows a cross sectional view taken on the line 4—4 of Figure 3.

Referring to the drawings the numeral 1 designates the tool holder which is seated in the spindle 2 and is locked therein by means of the through bolt 3 which is threaded into a recess 4 in the inner end of the holder.

The spindle is mounted to rotate in the bearing 5 of the machine.

The outer end of the holder 1 has the shank-receiving socket 6 which terminates at its inner end in a cylindrical recess 7.

The socket 6 has a sharp taper so that the shank will not stick therein.

The holder 1 has a transverse bore 8 wherein a locking cylinder is mounted to rotate. At one end this cylinder has an annular groove 10 therearound forming a keyway and a pin 11 is extended through the holder and screw threaded therein with its inner end projecting into the groove to lock the cylinder against detachment from the bore.

This cylinder has a half-round cut-away-portion forming a notch 12, opposite the recess 7, as clearly shown in Figures 2 and 3, the length of the notch being substantially the same as the diameter of the recess. It will be noted that the locking cylinder, or rotatable cam 9 extends transversely through the recess 7, at one side. When said bolt is turned to inactive position the cutaway-portion will clear the recess as shown in Figure 3 so as not to interfere with the insertion of the tool shank 13, hereinafter described. The locking bolt or cam has a polygonal end socket 14 to receive a socket wrench whereby it may be turned.

The tool shank 13 has a tapering portion 13a which fits into the tapering socket 6. The shank also has an annular flange 13b provided with opposed keyways 13c to receive the keys 15 carried by the holder 1 whereby a driving connection is established between the holder and the tool shank 13.

A head 16 is connected to the inner end of the tool shank by a reduced neck 17 which is slightly flexible. The side of head 16 facing the locking bolt 9 has a transverse half round groove forming a cam seat 18.

When the tapered portion of the shank is inserted into the tapered socket 6 the head 16 will project into recess 7 but not quite far enough to carry the seat 18 into concentric position relatively to the bore 8. This is clearly illustrated in Figure 3; and the head 16 will have a slight clearance between it and the opposite side of the recess 7. The locking bolt 9 may be now turned in a clockwise direction so as to carry the cam face 9a of the lock bolt 9 into contact with the seat 18, as shown in Figure 1 and this will draw the tapering portion of the tool shank into firmly seated position in the socket 6. There will also be a lateral pressure on the head 16 which will cause a lateral movement of said head but the neck 17 will flex to permit this and to allow the tapering portion of the tool shank to be drawn into and firmly seated in the socket 6 in true axial alinement with the holder 1.

The locking bolt or cam 9 may be turned far enough so that the cam face 9a thereof will contact with the cam seat 18 on center, or slightly past center so as to lock the parts together. Upon reverse rotation of locking bolt 9 to the position indicated in Figure 3 the tool shank and tool thereupon may be readily removed.

It is preferable, although not indispensable, that the extension of the shank, projecting into the recess 7, be yieldable. It may be formed rigid with the shank and with the seat 18 located adjacent the extreme inner end of the shank, when the shank is locked in position by the cam 9 it will be secured in axial alinement with the holder 1.

What I claim is:

1. In combination, a holder for machine tools having a frusto-conical shank-receiving socket whose inner end terminates in an approximately cylindrical recess, a cam member rotatably mounted in the holder and formed to project into, and to be withdrawn from, the recess upon rotation of said member, a tool shank having a frusto-conical shaped portion adapted to fit closely into the socket, a head on the inner end of the shank of less transverse diameter than, and projecting into, the recess, a reduced neck connecting the head integrally to the inner end of the shank, said head being provided with an arcuate seat to receive the cam member, upon said projection of the cam member into the recess, said cam member being operative, when projected into the seat, to draw the conical portion of the shank inwardly against the wall of the socket.

2. In a device of the character described a tool shank having a tapering portion terminating at its small end in a cylindrical extension, said extension having a transverse groove in one side and having an annular groove therearound between said side groove and the tapered portion, said annular groove forming a reduced neck which will flex upon application of lateral pressure exerted against the extension beyond the annular groove.

ROBERT B. KINZBACH.

REFERENCES CITED

The following references are of record in the file of this patent:

UNITED STATES PATENTS

| Number | Name | Date |
| --- | --- | --- |
| 283,745 | Bartlett | Aug. 28, 1883 |
| 1,861,504 | Maxfield | July 11, 1929 |
| 321,615 | Letter | July 7, 1885 |
| 1,785,495 | Richard | Oct. 22, 1927 |
| 1,407,668 | McCallum | Feb. 21, 1922 |
| 2,167,014 | Verderber | July 25, 1939 |
| 2,320,360 | Grey | June 1, 1943 |